INVENTOR.
JOHN R. VAN PATTEN

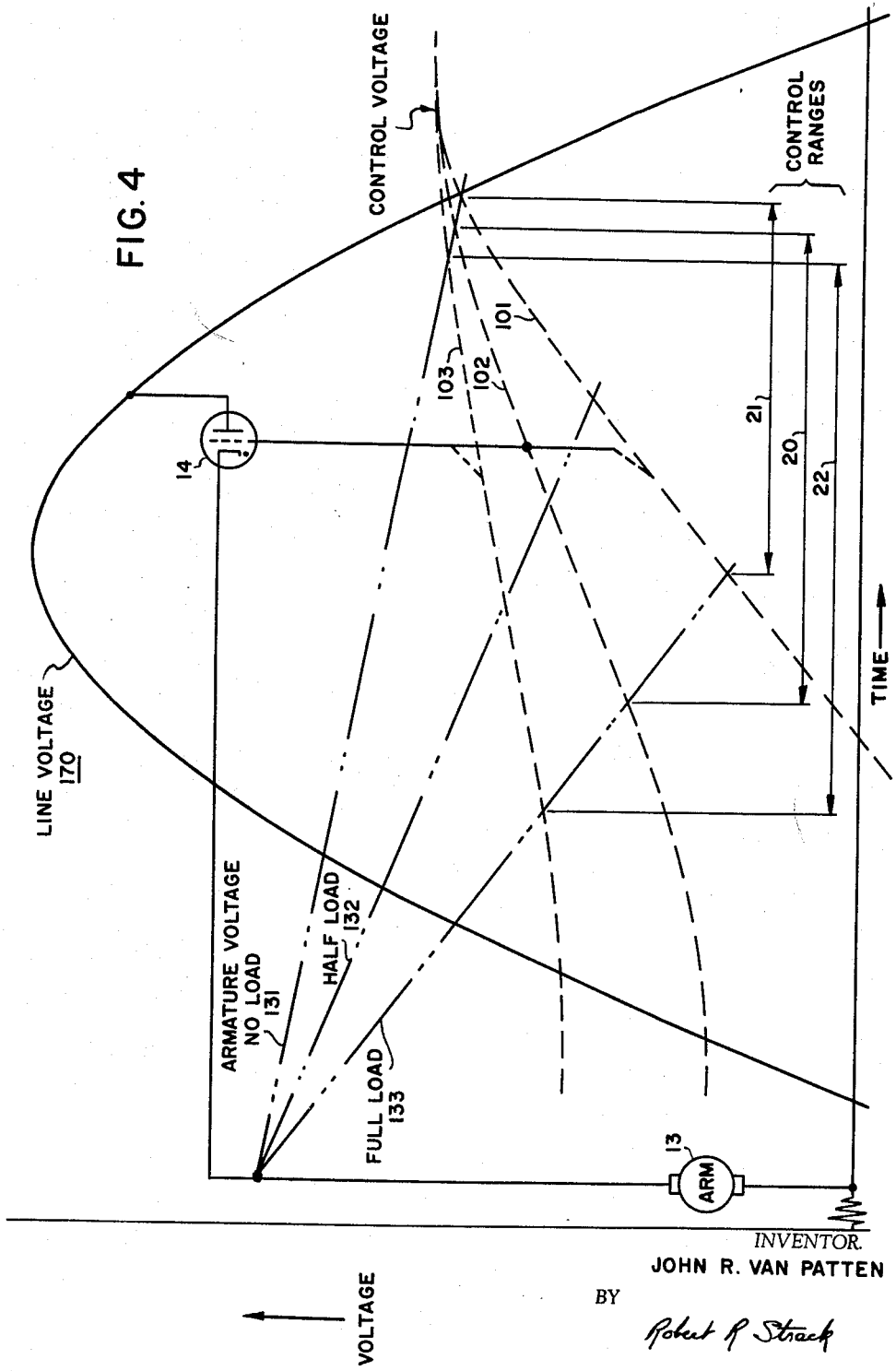

3,178,628
MOTOR CONTROL CIRCUITS
John R. Van Patten, Waynesboro, Va., assignor to General Electric Company, a corporation of New York
Filed Apr. 12, 1962, Ser. No. 187,081
6 Claims. (Cl. 318—331)

This invention relates to the automatic control of the speed of direct current motors and particularly, to the speed control of direct current motors supplied from an alternating current source.

The speed of a direct current motor is a function of the armature voltage and the voltage drop caused by the current flow through the armature resistance. A common means of speed control in such a motor is to keep the field constant and provide means for automatically varying the armature supply in accordance with the load.

One well recognized technique for controlling the armature supply, known as IR compensation, involves monitoring the current drawn by a motor and establishing the conduction period of a controlled rectifier that is serially connected between the armature and an alternating current source in accordance with the magnitude of the current. As the current drawn by the motor armature increases due to increasing load, the conduction period of the rectifier is increased to provide more energy. The circuitry used to accomplish this form of control is effective, but somewhat expensive.

Another technique for controlling the armature supply uses the counter-E.M.F. as an indication of the motor's speed. When the field is energized continuously, during the period that energy is not supplied to the motor, it acts as a generator and produces an armature voltage that is proportional to the speed. In a typical circuit using this control technique, a controlled rectifier is serially connected with the motor armature across an alternating current supply; its cathode being connected to a terminal of the armature and its plate being connected to a terminal of the supply. A control circuit provides a signal to the control element of the rectifier which is composed of a speed selecting direct voltage level and a speed regulating alternating voltage level that phase-lags the alternating current supply by approximately 90°. When the control signal and the armature voltage are substantially equal, the controlled rectifier fires and unidirectional power is supplied through the rectifier to the armature. Subsequently, the line voltage decreases to the level of the armature voltage, the rectifier stops conducting, and the motor coasts until the following cycle of the alternating current supply when the control signal and armature voltage are again substantially equal.

It will be understood that an increase in motor load causes a more rapid decrease in speed and in armature voltage and this is effective to cause earlier rectifier firing because the control voltage and the armature voltage reach substantial equality earlier. This yields greater power to drive the motor and, therefore, increases its speed to compensate for the loading effect. The converse of this occurs upon decrease of load and a less rapid decrease in speed. The circuitry used to accomplish motor speed control in response to armature voltage is relatively simple and reliable.

An object of the present invention is to provide a new and improved motor control circuit.

Another object of the present invention is to provide an improved motor control circuit that is operative in response to variations in load as reflected by variations in the armature voltage of the motor.

In the prior art, motor control circuits of the armature described are found to have excessive speed regulation. The speed regulation of a motor is the change in speed produced by a change in load. Of course, it is desirable to have such changes reduced to a minimum.

With the above-described circuit, the degree of corrective compensation provided by modifying the armature supply in accordance with variations in load is directly attributable to the magnitude of the alternating component of the control voltage. For any given magnitude of the alternating component, there is a definite "range of control." That is, the change in speed resulting from a change in load from no-load to full-load results in a specific advance of the controlled rectifier firing time depending upon the magnitude of the alternating voltage component. For each particular motor controlled, a particular alternating voltage magnitude will provide an optimum match to the characteristics of the motor and yield optimum compensation for restoration of the motor to its original speed after the change in load. As described more fully in conjunction with the drawings, a reduction of the alternating component of the control signal results in a longer range of control and an increase of the alternating component results in a shorter range of control. In the extremes, the former condition may result in over-compensation and undesirable speed-up, and the latter condition may result in under-compensation and undesirable slow-down.

Another object of the invention is to provide means for controlling speed regulation by selectively controlling the amplitude of the alternating component of the control voltage.

It has been found that modification of the alternating component of the control voltage alone, has the effect of changing both the no-load and full-load speeds of the controlled motor. Increasing the magnitude of the alternating component increases the no-load speed and decreases the loaded speed, and decreasing the magnitude of the alteranting component decreases the no-load speed and increases the loaded speed. By simultaneously changing both the alternating and direct voltage components of the control voltage, it is possible to develop a control system wherein the no-load speed remains substantially constant irrespective of changes in magnitude of the alternating voltage component.

Thus, still another object of the invention is to provide speed regulation means wherein changes in the magnitude of the alternating component of the control voltage do not adversely affect the no-load speed of a controlled motor.

In accordance with one embodiment of the invention, a controlled rectifier is serially connected with the armature of a motor across a source of alternating current and the field of the motor is connected to receive a constant half-wave rectified voltage from the same source. The control element of the rectifier has a composite signal applied thereto, comprising a variable magnitude direct voltage component and a variable magnitude alternating voltage component. The variable direct voltage component is obtained from the adjustable contact of a potentiometer serially connected with a rectifier across said source, and the variable alternating voltage is obtained from a phase shifting circuit connected between the adjustable contact of the potentiometer and the alternating current source. Phase shift of the alternating voltage component is developed by means of reactive elements and magnitude variation is achieved by use of a variable resistance.

The novel features of the invention are set forth with particularity in the appended claims. The invention itself, however, both as to its organization and method of operation, together with further objects and features thereof may best be understood by reference to the following description taken in conjunction with the drawings wherein:

FIGS. 3 and 4 are diagrams of the significant control portion of a supply cycle illustrating the effect of the unique means included in applicant's invention.

Figure 2:
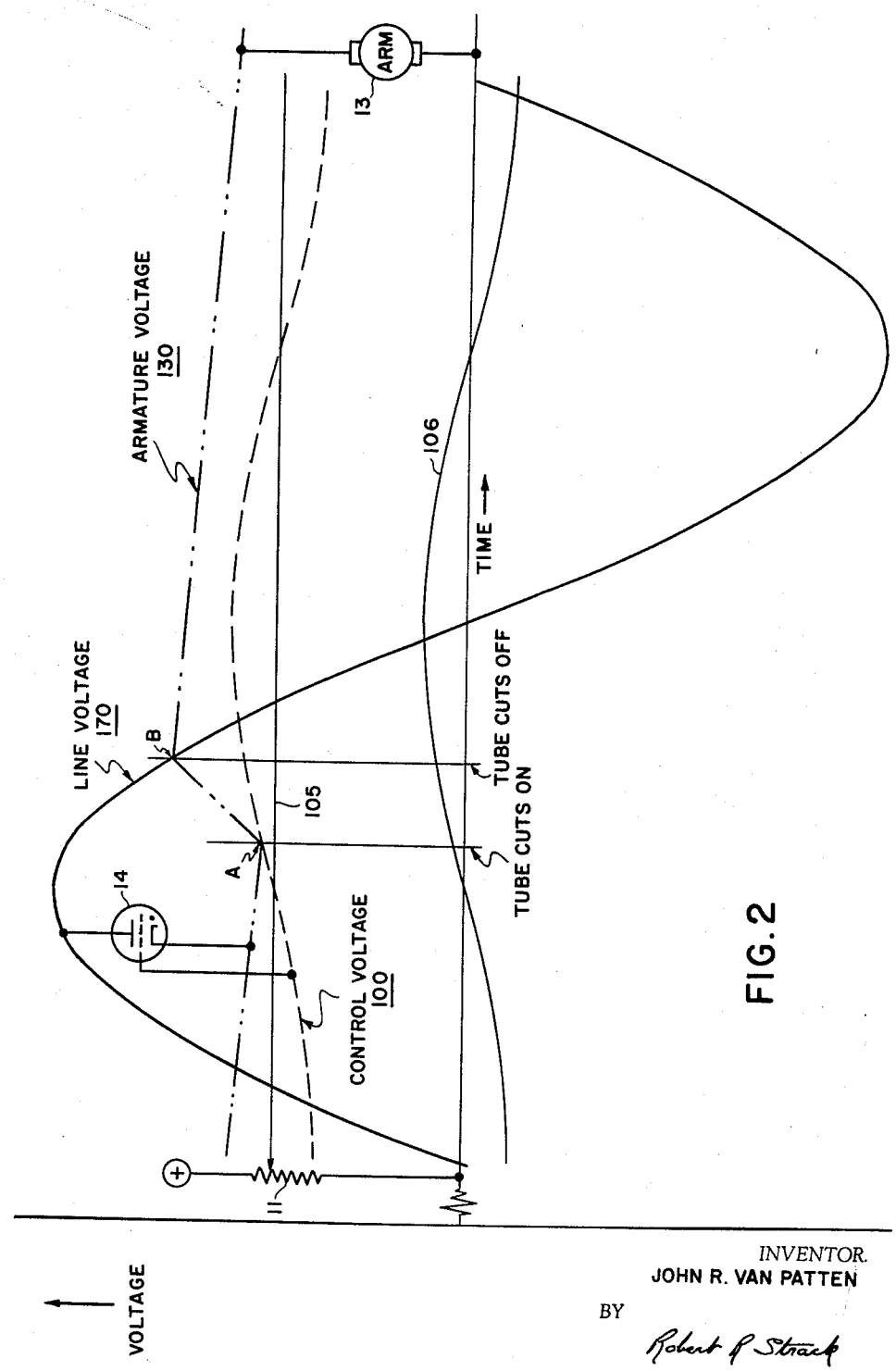
FIG. 2 is an explanatory diagram illustrating circuit operation during a typical full cycle of applied power from an alternating current source.
Figure 3:
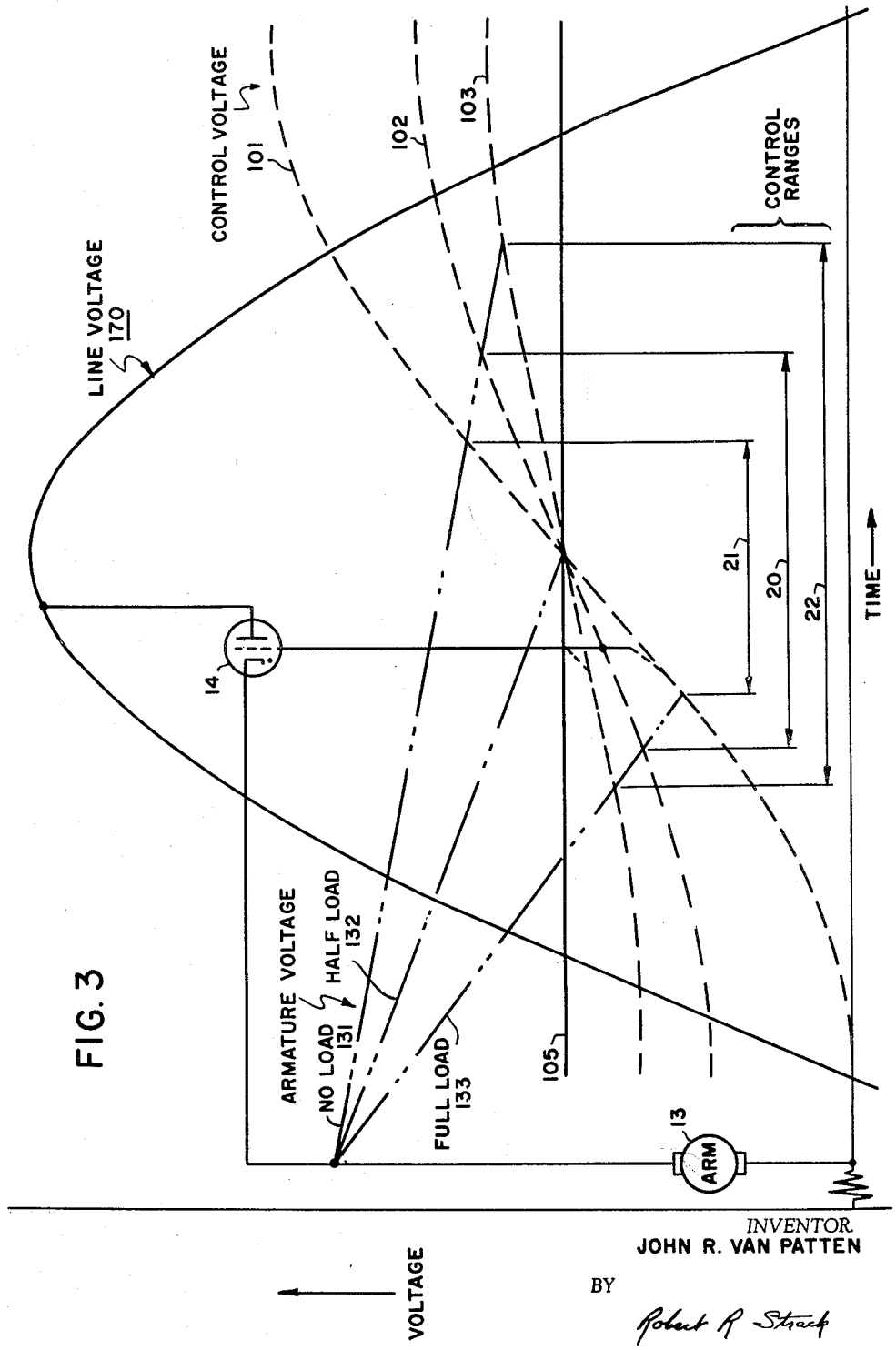

The invention will be described with the aid of the diagrams in FIGS. 2 through 4. These diagrams have been drawn as composites of voltage waveforms and circuit elements. This particular representation is found desirable because it leads to a graphic understanding of actual circuit operation. The representation utilizes the fact that particular voltages are applied to particular elements in an actual circuit. The voltages are illustrated as a function of time and the particular elements that generate the voltages, or respond to them, are pictorially presented on the diagrams by direct connection to the associated voltage depiction. For example, the armature 13 has a voltage generated across its terminals. This is shown in FIGS. 2, 3, and 4 by connecting armature 13 between a graphically represented voltage waveform 130 and the X-axis which represents a zero voltage level. The clarity of understanding made available by this descriptive technique will become apparent as the specification proceeds.

Figure 1:
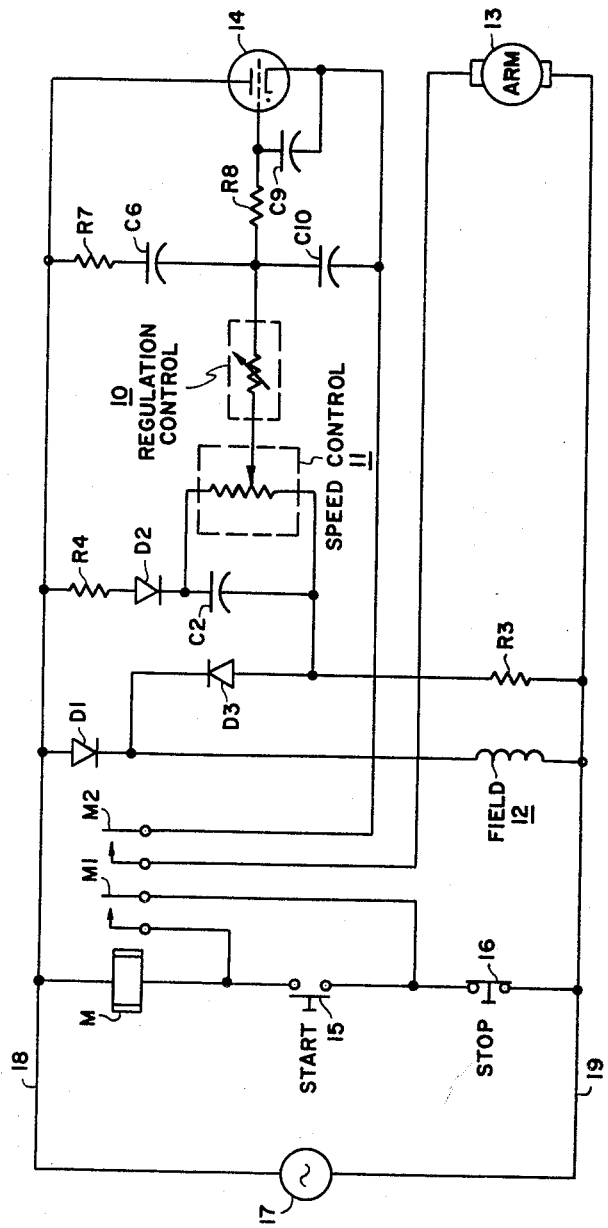
FIG. 1 is a circuit schematic of a motor control circuit in accordance with an illustrative embodiment of the invention.

The circuit schematic in FIG. 1 serves as a base for description of the present invention. As shown therein, a direct current motor armature 13 is serially connected with normally-open control contacts M2 and a thyratron 14 across supply conductors 18 and 19 which have an alternating current source 17 connected thereto. The field 12, associated with armature 13, is connected with a suitably oriented rectifier D1 across conductors 18 and 19 to receive power during the positive voltage excursion on conductor 18. In order to prevent inordinately high voltage surges upon collapse of field 12, a small resistor R3 and rectifier D3 are connected thereacross with an orientation designed to yield a low impedance path for the current induced by a collapsing field.

The firing time of thyratron 14, which of course controls the amount of power applied to armature 13, is jointly determined by the voltage on the upper terminal of armature 13 applied to the cathode, and a control signal which is composed of a direct and an alternating component applied to the grid. The direct voltage component is applied to the grid from the adjustable contact of a speed control potentiometer 11 via a variable regulation control impedance 10. Potentiometer 11 is supplied in a circuit extending between conductors 18 and 19 which comprises a resistance R4, a rectifier D2, speed control potentiometer 11, and resistor R3. A filter capacitor C2 is connected across the potentiometer to smooth out the alternating voltage component of the voltage thereacross. As previously noted, the magnitude of resistor R3 is small and consequently, has negligible effect upon the control circuitry. The alternating component of the control signal lags the alternating current supply voltage by approximately 90°. This phase shift is controlled and developed by means of capacitors C6, C9, and C10 in conjunction with resistor R7 and R8 and regulation control resistor 10. The unique results arising from the variability of resistor 10 are described in detail hereinafter.

Power is initially applied to armature 13 in FIG. 1 by energizing alternating current motor relay M. This relay is connected in series with start and stop buttons 15 and 16 across the supply 17, and has a pair of normally-open contacts M1 and M2. Contacts M1 shunt start button 15 and provide a holding circuit that is effective upon energization of relay M to sustain energization thereof until stop button 16 is actuated. Contacts M2, as previously noted, are serially connected between motor armature 13 and supply conductors 18 and 19 and thus provide a current path between source 17 and the armature when relay M is energized.

Rather than considering further the operation of the detailed circuit shown in FIG. 1, at this point, the invention will be more clearly appreciated and understood by considering the diagrams in FIGS. 2, 3, and 4. Each of these diagrams consists of a plurality of voltage waveforms plotted as a function of time, in combination with several circuit elements. In essence, the voltages represented by these waveforms act upon thyratron 14 or are generated by armature 13 of a control circuit such as shown in FIG. 1. In order to graphically illustrate this, the armature 13 is shown connected between the armature voltage waveform 130 and the X-axis. The thyratron 14 is supplied with the armature voltage upon its cathode, a control signal upon its grid, and the line voltage upon its anode. Consequently, leads from the cathode, grid, and plate of thyratron 14 are connected to the armature voltage waveform 130, the control signal waveform 100, and the line voltage waveform 170, respectively. The control signal 100 comprises a direct voltage 105 determined by speed regulation potentiometer 11 and an alternating voltage 106 that lags line voltage 170 by approximately 90°. Because the D.C. level of the control voltage is established primarily by the speed control potentiometer 11, the direct voltage waveform 105 is illustrated as being connected to the variable contact on a potentiometer 11 that is connected between a positive source (+) and the X-axis. It should be understood that the diagrams are for illustrative purposes and that the proportions between various waveforms are distorted to assist in understanding the concepts presented. Typical operation of the speed control circuit will now be considered.

After the motor has come up to the approximate operating speed, the conditions shown in the diagram of FIG. 2 represent operation during a typical cycle of line voltage 170. As line voltage 170 begins to go positive, control voltage 100, on the grid of thyratron 14, is still more negative than armature voltage 130, on the cathode of thyratron 14, and consequently, the thyratron is held in a nonconducting state and no power is being applied to armature 13. At this time, the motor is coasting and acting as a generator with a decreasing voltage output. During the period that line voltage 170 is positive, control voltage 100, which is 90° behind the line voltage in phase, is continuously increasing in magnitude; thus, at some instant during the positive half cycle of line voltage 170, a point "A" occurs at which armature voltage 130 is equal to control voltage 100. At this time, the grid and cathode of thyratron 14 have the same voltage level applied and thyratron 14 begins to conduct. Actually, the instant of firing is determined by the characteristics of the thyratron and will not correspond exactly to coincidence in magnitude of grid and cathode voltages.

In response to conduction of thyratron 14, armature 13 receives power and the motor begins to increase in speed. The increase in speed is reflected by an increase in armature voltage 130 until a point "B," at which armature voltage 130 is equal to line voltage 170. At this time, inasmuch as the plate of thyratron 14 is supplied by line voltage 170 and the cathode of the thyratron is supplied by armature voltage 130, the thyratron is rendered nonconductive and power is therefore removed from the armature 13. Once again the armature coasts, acting as a generator until the succeeding positive half cycle of line voltage when the operating cycle is repeated.

When there is a constant load, the rate of decrease of the armature voltage 130 is constant and intersects the control voltage 100 at the same instant during each cycle. This in turn forces thyratron 14 to fire for the same length of time during each cycle and results in a constant motor speed.

If the load is increased, the motor decelerates at a faster rate during the coasting portion of operation and the armature voltage will decrease at a faster rate. As a result, the armature voltage 130 intersects the control voltage 100 earlier in the positive portion of the line voltage cycle causing the thyratron to conduct earlier and supply more energy to the motor. This tends to raise the motor speed back to its original value.

If the load is decreased, the motor decelerates at a lower rate during the period that thyratron 14 is nonconducting. Consequently, the armature voltage 130 also decreases at a lower rate and intersects the control voltage 100 at a point later in the positive portion of line voltage cycle. Thyratron 14, under these conditions, fires later and conducts for a shorter time thereby supplying less energy to the motor and tending to lower the motor speed back to the original value.

For each magnitude of the alternating component of the control voltage there is a definite "range of control" representing the change in thyratron firing time brought about by the change in motor speed between no-load and full-load. Obviously, the magnitude of the alternating component of the composite control voltage must be properly chosen to match the characteristics of the motor being controlled, to insure that the amount of compensation afforded by the change in firing time is exactly enough to restore the motor to its original speed following each change in load. Heretofore, the magnitude of the alternating component has been established at a fixed value to obtain acceptable operation. As noted, each magnitude of the alternating component of the control signal has its own range of control, the range increasing as the magnitude decreases. In the extremes, changes in the alternating component magnitude can result in either over-compensation or under-compensation; where an increase in load will result in an increase in speed or a decrease in speed, respectively. FIG. 3 illustrates these effects.

The diagram in FIG. 3 is an exaggerated view of the positive half cycle of a typical cycle of line voltage 170. Armature voltage waveforms are illustrated for three conditions: waveform 131, representing no-load; waveform 132, representing half-load; and waveform 133, representing full-load. As shown, at no-load, the slope of armature voltage decay is relatively slight during the coasting interval of operation, whereas increasing the load, greatly increases the slope of armature voltage decay. In the exaggerated diagram of FIG. 3, three control voltages, 101, 102, and 103, are illustrated. It is assumed that the alternating component of control voltage 102 is of some basic magnitude, the alternating component of control voltage 103 has a magnitude 50% less than that of control voltage 102, and the alternating component of control voltage 101 has a magnitude 100% greater than that of control voltage 102. Three control ranges are noted at the bottom of the diagram, a basic range 20 which represents the speed regulation from no-load to full-load under the basic condition of control voltage 102; a narrow range 21 which represents the speed regulation from no-load to full-load with the 100% increased alternating component of control voltage 101; and a wide range 22 which represents the speed regulation from no-load to full-load with the 50% decreased alternating component of control voltage 103.

Note particularly, that as the alternating component of the control voltage is increased, the range of control is decreased and as the alternating component of the control voltage is decreased, the range of control increases. The ability to adjust the magnitude of the alternating component carries with it the ability to control the amount of speed regulation. When controlling this component, however, if only the magnitude of the alternating component is changed, both the no-load speed and the full-load speed change. Increasing the magnitude of the alternating component increases the no-load speed and decreases the loaded speed while decreasing the magnitude of the alternating component decreases the no-load speed and increases the loaded speed. It is undesirable to have the no-load speed vary once an operating speed is selected by the speed control, such as potentiometer 11. FIG. 4 illustrates how this undesirable characteristic that attends changing alternating component magnitude, may be alleviated.

The waveforms in FIG. 4 represent the same voltage quantities as those illustrated in FIG. 3. However, in the case of FIG. 4, the control voltages 101, 102, and 103, have a different direct current component in each case. As increasing magnitudes of alternating component are utilized, the direct component is decreased in order to establish a condition whereby the peak voltage magnitude of the control voltages is always the same. In other words, the average direct component of the composite grid signal is decreased by an amount equal to one-half the increase in the peak magnitude of the alternating component as the value of the alternating component is modified to obtain different control ranges. This causes a clustering of the intersection points between the control voltage waveforms 101, 102, and 103 with the no-load armature voltage waveform 131. This means, in operation, that the no-load speed is substantially constant irrespective of the control signal utilized. On the other hand, there is a considerable variation in the full-load intersection points when the alternating component of the control voltage is varied from 50% of a basic value (waveform 103) to 100% increase over that basic value (waveform 101). Once again, the control ranges are illustrated at the bottom of the diagram: range 20 representing the speed regulation when a basic control voltage 102 is used; range 21 illustrating the speed regulation when a control voltage having an alternating component 100% greater than the basic value is used; and range 22 illustrating the speed regulation when a control voltage having an alternating component 50% of the basic value is employed. The desired result of a minimal change in the no-load speed in response to changes in the alternating component of the thyratron control voltage has thus been achieved.

In recapitulation, it is seen that in order to obtain good speed regulation, it is desirable to control the amplitude of the alternating component of the control signal. Furthermore, it is seen that simple modification in this amplitude will result in a range of control which bridges the no-load and full-load conditions and causes substantial change in both as the amplitude of the alternating component is varied. A substantially stable no-load speed is obtained by decreasing the direct component of the control signal by an amount approximately equal to one-half the peak-to-peak change of the alternating component.

In circuits where the alternating component is interjected into the control signal by means of a transformer, a separate control may be used for varying the direct component appropriately for each change in the alternating components.

In the circuit shown in FIG. 1, it is possible to simultaneously modify the alternating and direct components of the control voltage by simply modifying the magnitude of a resistive element. Specifically, this resistive element is shown as a variable resistor in regulation control 10.

In the illustrated circuit, six elements determine the magnitude and phase shift of the alternating current component of the control voltage. The elements comprise resistors R7 and R8, capacitors C6, C9, and C10 and variable resistor 10. The magnitude of variable resistance 10 is particularly important because it is essentially in series with capacitor C6 and resistor R7 across the alternating current supply. Resistor R3 is of small magnitude as compared with the variable resistor 10 and resistance R7 and the same is true of speed control potentiometer 11. As variable resistance 10 is increased in resistance, the alternating current drop across it is increased and similarly, as it is decreased in resistance, the alternating current drop across it is decreased. It is thus possible to vary the alternating component without any significant change in the phase shift except at the extremely low resistance ends. Further, because the direct voltage level of the control signal is applied to the grid of thyratron 14 through regulation control resistor 10, this level decreases as the value of variable resistor 10 is increased and vice versa.

By selectively making resistance 10 variable, simple adjustments in the magnitude of this resistance yield a modification of both the alternating component of the control signal and of the direct voltage component. Experimentation shows that this is a most effective way of improving speed regulation and yet requires a minimum modification of many motor control circuits that have long existed in the art.

It will be obvious to those skilled in the art that the principle of control over the slope of the alternating current component of the composite control signal can be accomplished by means other than that specifically illustrated herein. One particular instance has been mentioned hereinbefore in connection with systems wherein a transformer is used to interject the alternating component into the control signal. Also, other modifications, such as the use of a silicon controlled rectifier in place of the thyratron 14 in the illustrated embodiment, would be within the scope of one skilled in the art.

The described circuitry constitutes a particular embodiment of this invention. It will, of course, be understood that it is not wished to be limited thereto since modifications can be made both in the circuit arrangements and in the instrumentalities employed and it is contemplated in the appended claims to cover any such modifications as fall within the true spirit and scope of the invention.

What is claimed as new and desired to be secured by Letters Patent of the United States is:

1. A motor control circuit comprising, a source of alternating current, a controlled rectifier serially connected between the armature of said motor and said source, means connecting a field winding of said motor to said source for continuously energizing said field winding, means connected to said source for generating a control signal comprising a direct voltage and an alternating voltage component, means connecting said control signal to said controlled rectifier to establish conduction thereof in accordance with the relationship between the magnitude of said control signal and the magnitude of the voltage across said armature, means for simultaneously increasing the magnitude of said alternating voltage component and decreasing the magnitude of said direct voltage component to provide a substantially constant peak amplitude for said control signal.

2. A motor control circuit comprising, a source of alternating current, a controlled rectifier serially connected between the armature of said motor and said source, means connecting a field winding of said motor to said source for continuously energizing said field winding, voltage division means connected across said source and operative to produce a direct voltage of controllable magnitude at the output thereof, phase shifting means connected between said source and the output of said voltage division means and operative to produce an alternating voltage component on said said direct voltage which lags the alternating current of said source, means connected in common to said voltage division means and said phase shifting means for simultaneously decreasing the magnitude of direct voltage at the output of said voltage division means and increasing the magnitude of said alternating voltage component, means for connecting the composite signal produced by said voltage division means and said phase shifting means to said controlled rectifier to establish conduction thereof in accordance with the relationship between the magnitude of said composite signal and the magnitude of the voltage across said armature.

3. A motor control circuit comprising, a source of alternating current, means connecting a field winding of said motor to said source for continuously energizing said field winding, voltage division means including a potentiometer connected across said source and operative to produce a direct voltage of controllable magnitude at the adjustable tap of said potentiometer, phase shifting means connected to said source adapted to produce an alternating voltage which lags said source by approximately 90°, variable means for combining said direct voltage and said alternating voltage to form a control signal having direct and alternating voltage components of selectable magnitude, a controlled rectifier having anode, cathode, and control elements, means for connecting said controlled rectifier in series with the armature of said motor across said source of alternating current, means for connecting said control signal to said control element whereby said controlled rectifier will begin conduction in accordance with the relative magnitudes of said control signal and the voltage across said armature.

4. A motor control circuit as defined in claim 3 wherein said variable means interconnects said phase shifting means and the adjustable tap of said potentiometer and comprises a variable resistance having a maximum magnitude greater than that of said potentiometer and greater than that of said phase shifting means.

5. A motor control circuit comprising, a source of alternating current, a controlled rectifier serially connected between the armature of said motor and said source, means connecting a field winding of said motor to said source for continuously energizing said field winding, a first circuit connected to said source of alternating current for developing a direct voltage of controllable magnitude, a second circuit connected to said source of alternating current for developing an alternating voltage of controllable magnitude which lags said alternating current, variable impedance means connected to each of said circuits and operative to simultaneously control the magnitude of said direct voltage and said alternating voltage, means connecting said variable impedance means to said controlled rectifier whereby the combined direct voltage and alternating voltage appearing thereon establishes conduction of said controlled rectifier in accordance with the relationship between the magnitude of said combined voltage and the magnitude of the voltage across said armature.

6. A motor control circuit comprising, a source of alternating current, means connecting a field winding of said motor to said source for continuously energizing said field winding, voltage division means including a potentiometer connected across said source and operative to produce a direct voltage of controllable magnitude at the adjustable tap of said potentiometer, phase shifting means including a portion of said potentiometer and a variable impedance means connected to said source and adapted to produce an alternating voltage which lags the alternating current of said source by approximately 90°, a controlled rectifier having anode, cathode, and control elements, means for connecting said controlled rectifier in series with the armature of said motor across said source of alternating current, and means for connecting said variable impedance means to said control element whereby said controlled rectifier will begin conduction in accordance with the relative magnitudes of the voltage on said variable impedance means and the voltage across said armature.

References Cited by the Examiner

UNITED STATES PATENTS

| | | | |
|---|---|---|---|
| 2,236,086 | 3/41 | Conover | 318—331 |
| 2,264,333 | 12/41 | Sutterlee | 318—345 |
| 2,528,688 | 11/50 | Chin et al. | 318—331 |
| 2,552,206 | 5/51 | Moyer | 318—331 |
| 2,839,714 | 6/58 | Mueller | 318—331 |

ORIS L. RADER, *Primary Examiner.*